(12) United States Patent
Almers et al.

(10) Patent No.: US 11,288,678 B2
(45) Date of Patent: Mar. 29, 2022

(54) METHOD AND SMART CARD ADAPTED FOR PROGRESSIVE FINGERPRINT ENROLLMENT

(71) Applicant: Fingerprint Cards AB, Gothenburg (SE)

(72) Inventors: Peter Almers, Limhamn (SE); Anders Nielsen, Frederiksberg C (DK); Troels Bjerre, Valby (DK)

(73) Assignee: FINGERPRINT CARDS ANACATUM IP AB, Gothenburg (SE)

( * ) Notice: Subject to any disclaimer, the term of this patent is extended or adjusted under 35 U.S.C. 154(b) by 301 days.

(21) Appl. No.: 16/486,306

(22) PCT Filed: Feb. 14, 2018

(86) PCT No.: PCT/SE2018/050135
§ 371 (c)(1),
(2) Date: Aug. 15, 2019

(87) PCT Pub. No.: WO2018/151647
PCT Pub. Date: Aug. 23, 2018

(65) Prior Publication Data
US 2020/0005304 A1    Jan. 2, 2020

(30) Foreign Application Priority Data
Feb. 20, 2017   (SE) ................. SE1750172-7

(51) Int. Cl.
*G06K 5/00*      (2006.01)
*G06Q 20/40*    (2012.01)
(Continued)

(52) U.S. Cl.
CPC .......... *G06Q 20/409* (2013.01); *G06F 21/32* (2013.01); *G06K 9/0002* (2013.01);
(Continued)

(58) Field of Classification Search
CPC ... G06F 21/32; H04L 63/0861; H04L 9/3231; G06K 20/40; G06K 9/00087
(Continued)

(56) References Cited

U.S. PATENT DOCUMENTS

| 7,078,603 B2 * | 7/2006 | Henry ...................... A01H 5/10 |
| | | 435/412 |
| 7,389,269 B1 | 6/2008 | Robinson et al. |

(Continued)

FOREIGN PATENT DOCUMENTS

| EP | 1290632 B1 | 1/2007 |
| GB | 2531095 A | 4/2016 |

(Continued)

OTHER PUBLICATIONS

PCT International Search Report and Written Opinion dated Jun. 11, 2018 for International Application No. PCT/SE2018/050135, 14 pages.

(Continued)

*Primary Examiner* — Daniel St Cyr
(74) *Attorney, Agent, or Firm* — RMCK Law Group, PLC

(57) ABSTRACT

The present invention relates to a method for progressively enrolling a user of a smart card, specifically applying a multi-step activation process for enabling fingerprint authentication for the smart card. The invention also relates to a corresponding smart card and to a computer program product. The present invention provides a solution for seamless fingerprint enrollment for a smart card user.

18 Claims, 3 Drawing Sheets

(51) Int. Cl.
  *G06F 21/32* (2013.01)
  *G06K 9/00* (2022.01)
  *G06Q 20/34* (2012.01)

(52) U.S. Cl.
  CPC ..... *G06K 9/00067* (2013.01); *G06K 9/00087* (2013.01); *G06Q 20/341* (2013.01); *G06Q 20/352* (2013.01); *G06Q 20/4012* (2013.01); *G06Q 20/40145* (2013.01); *G06Q 2220/00* (2013.01)

(58) Field of Classification Search
  USPC .................................. 235/380, 382; 705/72
  See application file for complete search history.

(56) References Cited

U.S. PATENT DOCUMENTS

| | | | | |
|---|---|---|---|---|
| 7,778,935 | B2 * | 8/2010 | Colella | ................. G06Q 30/06 |
| | | | | 705/67 |
| 9,928,355 | B2 | 3/2018 | Boshra | |
| 10,216,977 | B2 * | 2/2019 | Tse | .......................... G06F 21/32 |
| 2005/0139685 | A1 | 6/2005 | Kozlay | |
| 2013/0272586 | A1 | 10/2013 | Russo | |
| 2014/0210589 | A1 | 7/2014 | Grace | |
| 2016/0180146 | A1 * | 6/2016 | Setterberg | .......... G06K 9/00087 |
| | | | | 382/124 |
| 2016/0350574 | A1 * | 12/2016 | Weber | ................ G06K 9/00026 |
| 2018/0173920 | A1 * | 6/2018 | Jonsson | ............... G06K 9/6228 |

FOREIGN PATENT DOCUMENTS

| | | |
|---|---|---|
| WO | 2008147457 A1 | 12/2008 |
| WO | 2014068090 A1 | 5/2014 |
| WO | 2016133554 A1 | 8/2016 |
| WO | 2016190803 A1 | 12/2016 |

OTHER PUBLICATIONS

Apple Inc., "iOS Security—White Paper," Oct. 2014, 50 pages.
EPO Communication Pursuant to Rule 114(2) EPC dated Feb. 27, 2020 for EP Application No. 18753747.7, 17 pages.
International Standard, ISO/IEC 24787—Information Technology—Identification Cards—On-card biometric comparison, Dec. 15, 2010, 45 pages.

* cited by examiner

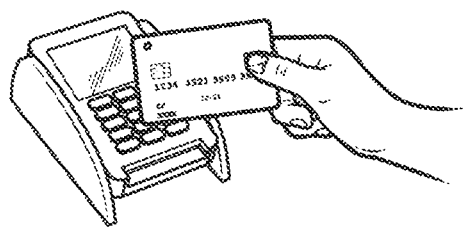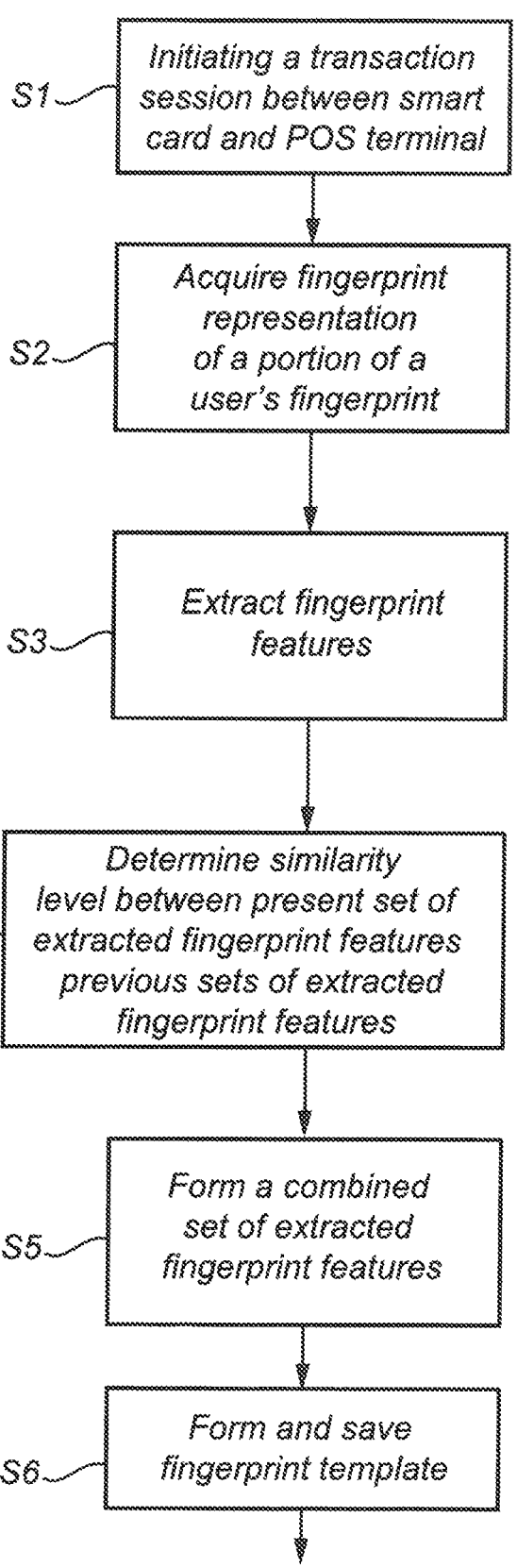
Fig. 3A
Fig. 4A

METHOD AND SMART CARD ADAPTED FOR PROGRESSIVE FINGERPRINT ENROLLMENT

CROSS-REFERENCE TO RELATED APPLICATIONS

This application is a 371 U.S. National Stage of International Application No. PCT/SE2018/050135, filed Feb. 14, 2018, which claims priority to Swedish Patent Application No. 1750172-7, filed Feb. 20, 2017. The disclosures of each of the above applications are incorporated herein by reference in their entirety.

TECHNICAL FIELD

The present invention relates to a method for progressively enrolling a user of a smart card, specifically applying a multi-step activation process for enabling fingerprint authentication for the smart card. The invention also relates to a corresponding smart card and to a computer program product.

BACKGROUND OF THE INVENTION

The use of biometric techniques to identify and/or authenticate the identity of a user is increasing. Biometric techniques that are promoted for this use include voice, fingerprint, iris, vein pattern and other scans. Currently, the use of fingerprint sensors for capturing a fingerprint has shown to be specifically promising, for example due to its ease of integration with different types of electronic equipment, such as smartphones, watches, tablets, or any other type of electronic devices where personalized user interaction is advantageous.

In the above typical prior-art examples of electronic equipment having an integrated fingerprint sensor, the electronic equipment is generally provided with some form of graphical user interface (GUI) for instructing the user on how to start using the functionality provided by means of the fingerprint sensor. For example, the GUI may be specifically adapted to instruct the user on how to enroll a finger for allowing future authentication of the user. However, there also exists electronic equipment that lacks a GUI for providing suitable instructions to the user during the enrollment process, such as a smart card having an integrated fingerprint sensor, for example to be used as an alternative to using a PIN code. In such a case, the enrollment process must typically involve some form of further electronic equipment, at least to be used for providing instructions to the user during the enrollment of a fingerprint for the user.

An example of such a smart card enrollment process is disclosed in US20050139685, where for example a bank is functioning as an authority for issuing the smart card. Specifically, in US20050139685 the smart card is inserted into a smart card reader being arranged in communication with a computer having a dedicated security mechanism for enrolling the fingerprint of the user.

Using dedicated "enrollment equipment" as proposed in US20050139685 may possibly be costly to provide and support if and when the general population transition from PIN only smart cards to smart cards having integrated fingerprint sensors. In addition, it would be desirable to allow the enrollment process to be somewhat automated, meaning that the amount of manual clerical interaction for authenticating the user during the enrollment process is reduced. Accordingly, there seems to be room for further improvement in securely enrolling a fingerprint of a user with a smart card comprising an integrated fingerprint sensor, specifically from a perspective of cost and user interaction.

SUMMARY OF THE INVENTION

In view of the above-mentioned security problems, it is an object of the present invention to provide a simplified method for enrolling a fingerprint of a user with a smart card comprising an integrated fingerprint sensor.

According to an aspect of the present invention, it is therefore provided a method of multi-step activation of fingerprint authentication for a user of a smart card, the smart card comprising a fingerprint sensing system including a fingerprint sensor configured for capturing a fingerprint representation of a fingerprint pattern of a finger of a user, and processing circuitry connected to and configured to control the operation of the fingerprint sensor, the method comprising the steps of acquiring, using the fingerprint sensor, a partial fingerprint representation of a portion of the user's fingerprint during a present step in the multi-step fingerprint authentication activation, extracting, using the processing circuitry, fingerprint features from the partial fingerprint representation, forming a present set of fingerprint features, determining, using the processing circuitry, a similarity level between the present set of extracted fingerprint features and sets of previously extracted fingerprint features, wherein the sets of previously extracted fingerprint features are formed during a preceding step in the multi-step fingerprint authentication activation, forming, using the processing circuitry, a combined set of extracted fingerprint features if the matching level is above a first threshold, completing, if an enrollment criterion is met, the multi-step fingerprint authentication activation by forming a fingerprint template based on the combined set of extracted fingerprint features, saving the fingerprint template together with an identifier for the fingerprint to thereby enroll the fingerprint of the user's finger, and enabling fingerprint authentication for the user of the smart card, wherein the smart card further comprises a wireless transceiver for wireless communication with an electronic transaction terminal and the method further comprises the steps of requesting the user to input a PIN code in the electronic transaction terminal, authenticating the PIN code, and enabling fingerprint authentication for the user of the smart card only if the PIN code is successfully authenticated.

By means of the invention, it is possible to allow the enrollment of a user with e.g. a "new" smart card to be performed progressively, typically while the user is using his smart card using another type of authentication, such as authenticating himself with an identity card or preferably using the PIN code related to the smart card. Specifically, the invention proposes fingerprint activation process where portions of the user's fingerprint is captured over time (in conjunction with a plurality of consecutive transactions/sessions) and essentially in the background while the user for example is performing a normal payment process in conjunction with e.g. a POS terminal and using his PIN code. That is, each time the user is to perform a transaction, such as for example to pay for a product in a shop, he will at the same time place his finger onto the fingerprint sensor, whereby a partial fingerprint representation of a portion of the user's fingerprint is acquired. The expression PIN code (Personal identification number) should be interpreted broadly and is understood to include any type of information that may be provided using e.g. an input device such as a keyboard, etc.

Processing circuitry comprised with the smart card will in accordance to the present invention be adapted to extract fingerprint features from the acquired partial fingerprint representation, and try to match those features with previously acquired fingerprint information (features) with the purpose of forming a fingerprint template. Once there has been collected "enough" information during consecutive use of the smart card, and thus an enrollment criterion has been met, the fingerprint template is saved together with an identifier for the fingerprint (such as for example a pointer to the user, which finger of the user that has been enrolled, or a general identifier for the user), such as in a digital (preferably encrypted) memory comprised with the smart card. The enrollment criteria may in an embodiment be defined as estimated finger coverage for the combined set of extracted fingerprint features. In other embodiments, the number of acquired images or the accumulated number of extracted features may be used in defining the enrollment criteria. As the template is securely stored with the smart card, it may be possible to enabling use of the fingerprint sensor for authenticating the user, for example when performing a payment process, in conjunction with e.g. a POS terminal.

An advantage with the proposed multi-stage (multi-session) activation and fingerprint enrollment for the smart card is that there will not be any need for a specifically purposed electronic device for allowing the user to enroll one of a plurality of fingers with the (new) smart card. Rather, in accordance to the invention it is possible to rely on the fact that the user is allowed to use the smart card even though the smart card has not yet been activated for fingerprint authentication. In addition, the user will not have to spend tedious "extra time" for fingerprint enrollment, since the enrollment/fingerprint activation process is performed in the background.

Within the context of the present disclosure, the expression "fingerprint representation" (or fingerprint image) should be interpreted broadly and to include both a regular "visual image" of a fingerprint of a finger as well as a set of measurements relating to the finger when acquired using the fingerprint sensor. A plurality of fingerprint images may be subsequently acquired and fused together during a single session, where the resulting information is used as an input for determining the sets of features.

It should be understood that the fingerprint sensor preferably is a fingerprint touch sensor; however, the invention may also be implemented using e.g. a swipe fingerprint sensor. The fingerprint sensor may be implemented using any kind of current or future fingerprint sensing principle, including for example capacitive, optical, or thermal sensing technology. However, at present capacitive sensing is most preferred. Both one and two-dimensional sensors are possible and within the scope of the invention.

The expression "processing circuitry" as used above should be understood to include any type of computing device, such as an ASIC, a micro-processor, etc. It should also be understood that the actual implementation of such a processing circuitry may be divided between more than a single device/circuit.

The smart card may in one preferred embodiment be a hybrid smart card, implementing both of contactless and contact interfaces (electrical contact pads) on a single card. Accordingly, for achieving the contactless interface the smart card further comprises the above mentioned wireless transceiver for wireless communication with the electronic transaction terminal, such as for example the above mentioned POS terminal. The wireless transceiver may for example be adapted for at least one of Bluetooth, Wi-Fi, and NFC communication. The wireless functionality could possibly be limited to use only once the user has enrolled his fingerprint with the smart card, for example for payment purposes as is known within the technical area of the invention.

In such an embodiment, it may be possible for the user to interact with the POS terminal for performing the multi-step fingerprint activation according to the invention as well as for performing the transaction, e.g. for payment of the purchased service or product.

The method further comprise the steps of requesting the user to input a PIN code in the electronic transaction terminal, authenticating the PIN code and enabling fingerprint authentication for the user of the smart card only if the PIN code is successfully authenticated. Accordingly, a further level of security may be achieved for allowing the process for fingerprint activation to fully complete. It should be understood that it in some embodiment of the invention may be possible to instruct the user, such as through a user interface of the electronic transaction terminal, to enter the PIN code each time further fingerprint features are to be "added" for forming the template.

In line with the above discussion, the smart card is preferably adapted to receive and validate authentication information provided from the electronic transaction terminal and only perform the enrollment steps of the invention if the authentication information is successfully validated. Accordingly, the user may be instructed to enter a previously provided (e.g. by a postal or electronic letter, or similar, provided separately from the delivery of the smart card) piece of authentication information before the process proceeds to initially allowing the user to enroll his finger with the smart card. The authentication information may for example be a (possibly one-time) PIN code or a password, to be entered within the GUI, such as a display element, provided at/with the electronic transaction terminal.

In an embodiment, the smart card further comprises a user interface for informing the user if the fingerprint authentication is enabled, and the method further comprises the step of activating the user interface if fingerprint authentication is activated. The user interface provided with the smart card may in one embodiment be a light source, such as an LED integrated with a surface of the smart card, for example indicating an intermediate status within the enrollment/fingerprint activation process.

It may be preferred to only performing the steps of acquiring, extracting and forming as long as a transaction session between the smart card and the electronic transaction terminal is maintained. Thus, the user may possibly be requested to keep the smart card a predetermined distance from the electronic transaction terminal for allowing a further step in the multi-step activation of fingerprint authentication to be performed. Such an implementation will of course provide further security to the activation process, reducing the risks with e.g. a hacker trying to falsely activating the fingerprint functionality for the smart card. The predetermined distance may in some embodiment of the invention for example be set based on an "NFC field" provided by the electronic transaction terminal and used by the smart card.

The enrollment process may in some embodiments of the invention be allowed to be dynamically adjusted in the sense that the matching between the forming a present set of fingerprint features and the sets of previously extracted fingerprint features. That is, during e.g. the first few "runs" the similarity level may be matched to an in comparison lower first threshold, as compared to an increased first threshold used during a later stage of the enrollment process. Possibly, the first threshold may be dynamically (e.g. "slowly") increased for each or the sessions where further fingerprint data is captured by the fingerprint sensor. However, it should in this embodiment be understood that it in some situations may be desirable to include some additional security measures to ensure that so called "template poisoning" does not occur.

In an embodiment of the invention, the smart card may be "locked" once the fingerprint authentication functionality has been completed. Accordingly, the smart card may in such an implementation not be allowed to be reconfigured for another user/finger. It should be understood that locking also may be done in case authentication attempts failed reaches an unacceptable level. However, it should be understood that the smart card still may be adapted for allowing an update of the template to take place, even after enabling fingerprint authentication and possibly also if the smart card has been locked. Template update may for example be performed in case it is detected that the fingerprint pattern of (a rightful and authenticated) user has slightly changed. The template update is thereby used for "tracking" a change (such as a scar, etc.) in the fingerprint pattern of the user's finger.

According to another aspect of the present invention, there is provided a smart card comprising a fingerprint sensing system including a fingerprint sensor configured for capturing a fingerprint representation of a fingerprint pattern of a finger of a user, and processing circuitry connected to and configured to control the operation of the fingerprint sensor, wherein the smart card is adapted for transition between a fingerprint authentication inactive state and a fingerprint authentication active state, wherein the processing circuitry is adapted to acquire, using the fingerprint sensor, a partial fingerprint representation of a portion of the user's fingerprint during a present step in the multi-step fingerprint authentication activation, extract fingerprint features from the partial fingerprint representation, forming a present set of fingerprint features, determine a similarity level between the present set of extracted fingerprint features and sets of previously extracted fingerprint features, wherein the sets of previously extracted fingerprint features are formed during a preceding step in the multi-step fingerprint authentication activation, form a combined set of extracted fingerprint features if the matching level is above a first threshold, complete, if an enrollment criterion is met, the multi-step fingerprint authentication activation by forming a fingerprint template based on the combined set of extracted fingerprint features, save the fingerprint template together with an identifier for the fingerprint to thereby enroll the fingerprint of the user's finger, and enable fingerprint authentication for the user of the smart card, wherein the smart card further comprises a wireless transceiver for wireless communication with an electronic transaction terminal and the processing circuitry is further adapted to request the user to input a PIN code in the electronic transaction terminal, authenticate the PIN code, and enable fingerprint authentication for the user of the smart card only if the PIN code is successfully authenticated. This aspect of the invention provides similar advantages as discussed above in relation to the previous aspect of the invention.

In accordance to a still further aspect of the invention there is provided a computer program product comprising a non-transitory computer readable medium having stored thereon computer program means for multi-step activation of fingerprint authentication for a user of a smart card, the smart card comprising a fingerprint sensing system including a fingerprint sensor configured for capturing a fingerprint representation of a fingerprint pattern of a finger of a user, and processing circuitry connected to and configured to control the operation of the fingerprint sensor, the computer program product comprising code for acquiring, using the fingerprint sensor, a partial fingerprint representation of a portion of the user's fingerprint during a present step in the multi-step fingerprint authentication activation, code for extracting, using the processing circuitry, fingerprint features from the partial fingerprint representation, forming a present set of fingerprint features, code for determining, using the processing circuitry, a similarity level between the present set of extracted fingerprint features and sets of previously extracted fingerprint features, wherein the sets of previously extracted fingerprint features are formed during a preceding step in the multi-step fingerprint authentication activation, code for forming, using the processing circuitry, a combined set of extracted fingerprint features if the matching level is above a first threshold, code for completing, if an enrollment criterion is met, the multi-step fingerprint authentication activation by forming a fingerprint template based on the combined set of extracted fingerprint features, code for saving the fingerprint template together with an identifier for the fingerprint to thereby enroll the fingerprint of the user's finger, and code for enabling fingerprint authentication for the user of the smart card, wherein the smart card further comprises a wireless transceiver for wireless communication with an electronic transaction terminal and the computer program product further comprises code for requesting the user to input a PIN code in the electronic transaction terminal, code for authenticating the PIN code, and code for enabling fingerprint authentication for the user of the smart card only if the PIN code is successfully authenticated. Also this aspect of the invention provides similar advantages as discussed above in relation to the previous aspects of the invention.

In summary, the present invention relates to a method for progressively enrolling a user of a smart card, specifically applying a multi-step activation process for enabling fingerprint authentication for the smart card. The invention also relates to a corresponding smart card and to a computer program product. The present invention provides a solution for seamless fingerprint enrollment for a smart card user.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which:

FIGS. 3A and 3B conceptually shows user interaction with the smart card and a POS terminal for fingerprint activation of the smart card, and FIGS. 4A and 4B provides a flowchart illustrating the exemplary steps of the invention for fingerprint enrollment of a user with a smart card.

DETAILED DESCRIPTION

Figure 1:
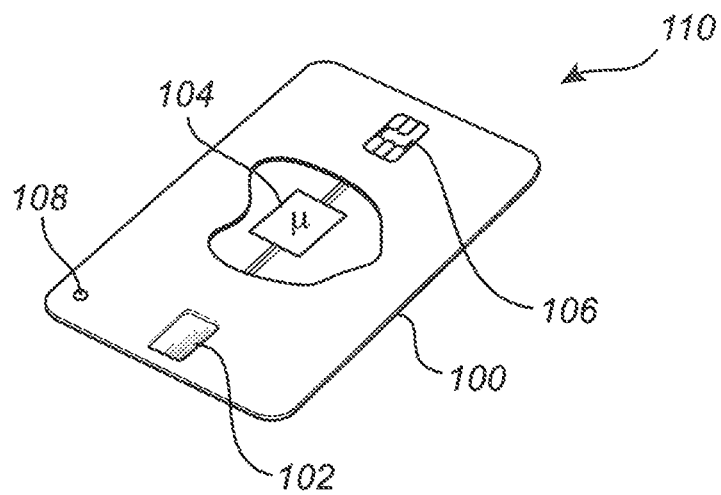
FIG. 1 schematically illustrates a smart card to be used in conjunction with the multi-step activation of fingerprint authentication methodology according to the present invention.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person. Like reference characters refer to like elements throughout.

Turning now to the drawings and to FIG. 1 in particular, there is schematically illustrated a smart card carrier 100 integrating a fingerprint sensing system including a fingerprint sensor 102 including a plurality of sensing elements and configured for capturing a fingerprint representation of a fingerprint pattern of a finger of a user, as well as a processing circuitry 104 connected to and configured to control the operation of the fingerprint sensor 102. In this embodiment the fingerprint sensor 102 is arranged on the front side of the smart card 100. However, the fingerprint sensor 102 may as an alternative (or also) be provided on a back side of the smart card carrier 100. The fingerprint sensor 102 may, for example, be used for authenticating the user when performing a payment/transaction, for example allowing the smart card 100, once the finger of the user has been enrolled, to interact with a POS terminal 302 (as seen in FIG. 3). Furthermore, the smart card carrier 100 may integrate a plurality of contact pads 106 electrically connected to at least the processing circuitry 104, possibly allowing for providing a wired connection with the POS terminal 302 if/when the smart card carrier 100 is inserted in a card slot provided with the POS terminal 302.

In addition, the smart card carrier 100 may in some embodiments also include a user interface, such as for example a light source 108 (e.g. a light emitting diode, LED) integrated with the smart card carrier 100 and arranged in electrical connection with the processing circuitry 104. Still further, the smart card carrier 100 preferably comprises means (not shown) for allowing wireless interaction with the POS terminal 302, such as adapted for allowing near field communication (NFC) between the smart card carrier 100 and the POS terminal 302. Accordingly, in using wireless communication the user need not insert the smart card carrier 100 into the card slot of the POS terminal 302. The NFC connection between the smart card carrier 100 and the POS terminal may further be used for providing electrical power to the smart card carrier 100, in a manner known to the skilled person.

The smart card carrier 100 forms together with the fingerprint sensor 102, the processing circuitry 104, etc., a smart card system 110.

The processing circuitry 104 further comprises a memory, such as a database, e.g. for storing one or a plurality of fingerprint template for one or a plurality of fingers for the user. The processing circuitry 104 may each include a microprocessor, microcontroller, programmable digital signal processor or another programmable device. The processing circuitry 104 may also, or instead, each include an application specific integrated circuit, a programmable gate array or programmable array logic, a programmable logic device, or a digital signal processor. Where the processing circuitry 104 includes a programmable device such as the microprocessor, microcontroller or programmable digital signal processor mentioned above, the processor may further include computer executable code that controls operation of the programmable device. It should be understood that all or some parts of the functionality provided by means of the processing circuitry 104 (or generally discussed as "processing circuitry") may be at least partly integrated with the fingerprint sensor 102.

Figure 2:
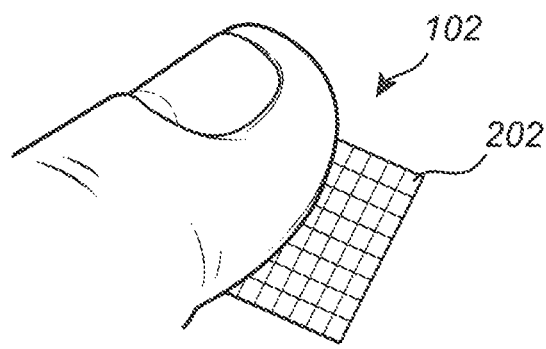
FIG. 2 exemplifies a fingerprint sensor integrated with the inventive smart card.

With further reference to FIG. 2, there is conceptually illustrated a somewhat enlarged view of the fingerprint sensor 102. In the case of employing a capacitive sensing technology, the fingerprint sensor 102 is configured to comprise a large plurality of sensing elements, preferably arranged as a two-dimensional array. The two-dimensional array may have sizes depending on the planned implementation and in an embodiment 160×160 pixels are used. Other sizes are of course possible and within the scope of the invention, including two-dimensional array with less pixels as compared to the above example. A single sensing element (also denoted as a pixel) is in FIG. 2 indicated by reference numeral 202.

Figures 3B, 4B:
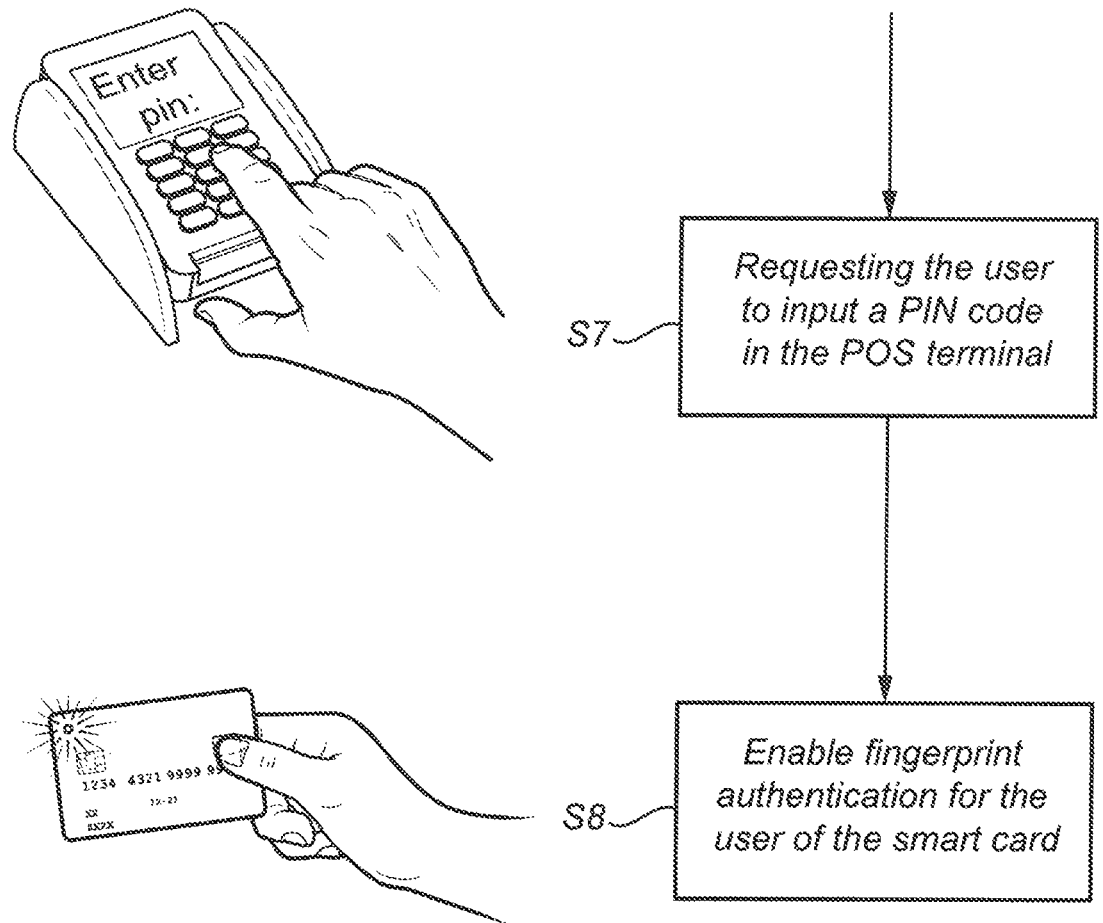

Turning now to FIGS. 3A and 3B in conjunction with FIGS. 4A and 4B, there is conceptually illustrated a portion of multi-step activation of fingerprint authentication for a user of the smart card system 110, as defined by the present invention. Typically, the process for the user starts with the user receiving a "new" and un-enrolled smart card system 110. Accordingly, the possibility of using the fingerprint functionality provided with the smart card has not yet been activated. In a possible embodiment of the invention, the user receives the smart card system 110 and a thereto related PIN code in two separate letters from e.g. a bank or other authority. Thus, the smart card system 110 is possibly some form of bank card, such as a debit or credit card. The smart card may also be an entry card, ID card, etc.

When the user for the first time uses hos new smart card for paying for a purchase, for example in a shop, he will be instructed within e.g. a display element 304 of the POS terminal 302 to arrange the smart card system 110 within an "NFC field" provided by the POS terminal 302, for example extending a predetermined distance from the POS terminal 302, preferably in close vicinity of the POS terminal 302. In a possible non-limiting embodiment, the NFC field extends from around 0-40 cm from the POS terminal 302.

Once within the NFC field, a wireless transaction session is initiated, S1, between the smart card system 110 and the POS terminal 302. Preferably, when the smart card 102 is still within the NFC field of the POS terminal 302 and the user place a selected finger on the fingerprint sensor 102, the fingerprint sensor 102 will acquire, S2, a partial fingerprint representation of a portion of the user's fingerprint. The processing circuitry 104 will subsequently extract, S3, fingerprint features from the partial fingerprint representation, forming a present set of fingerprint features 306. As this is the first time the fingerprint sensor 102 is acquiring fingerprint information in regards to the user, no previous fingerprint data is typically stored with the smart card system 110, and thus the fingerprint features 306 will be stored within the above mentioned memory e.g. related to the processing circuitry 104, and the fingerprint activation process is temporarily paused.

The next time the user is to interact with a POS terminal 302 (not necessarily the same as the first time and not necessarily at the same store), the process of acquiring partial fingerprint representation of a portion of the user's fingerprint and extracting fingerprint features 308 is performed. However, as the smart card system 110 at this subsequent use has previously stored fingerprint features (i.e. features 306), it is now possible move further in the fingerprint activation process. Specifically, a similarity level is determined, S4, between the present set of extracted features 308 and the previously extracted fingerprint features 306. Specifically, the matching process implements a scoring functionality which correlates with the amount of overlap between the fingerprint features 306 and 308 that relates to the fingerprint images acquired during the different sessions.

If the score exceeds a certain threshold, the decision is match, and a combined set of fingerprint features 310 (based on the features 306 and 308) is formed, S5. The combined set of features will, in subsequent session for fingerprint activation, be used in the comparison process with a present set of extracted fingerprint features. It may in accordance to the invention be possible to allow the threshold to be dynamically adjusted, for example dependent on the "number of features" comprised with the combined set of fingerprint features 310. That is, if the combined set of features 310 comprises an in comparison large number of features then the threshold is set higher, as the present set of extracted features are expected to match "better" as compared to an early stage where the combined set of features 310 comprises in comparison a fewer number of fingerprint features 310.

Once a "sufficient" number of fingerprint features have been collected for the selected finger of the user, possibly based on an estimation of a coverage area of the user's finger, a fingerprint template may be formed, S6 and saved with the smart card system 110.

In accordance to the invention it may in this stage, optionally, be desirable to request, S7, the user to input a fingerprint activation string, such as a PIN code (being the same or a different PIN code as compared to the general PIN code used with the smart card system 110). This step obviously creates an extra layer of security for allowing the enrollment to fully complete. The extra layer of security could also or alternatively be achieved by means of another type of identification of the user, for example using an identity card to be reviewed by a shop employee or similar. The fingerprint activation string may also be a general password provided to the user. It may be desirable to require that the smart card system 110 stays within the above-mentioned NFC field also when entering the PIN code or similar.

It should be understood that it may be possible, and within the scope of the invention to request the user to enter the fingerprint activation string or PIN code each time (e.g. before) the fingerprint sensor acquired information during the fingerprint activation process.

Once the above mentioned optional step (S7) has been completed it may be possible to enable, S8, fingerprint authentication for the user of the smart card system 110, possibly including informing the user by means of flashing the light source 108, for example in a green color. Accordingly, once fingerprint authentication has been enabled, the user will be able to perform e.g. a purchase, and authenticate the purchase by placing his (selected) finger at the fingerprint sensor 102. During the authentication process, fingerprint information is acquired using the fingerprint sensor 102 and processed by the processing circuitry 104, including a matching with the fingerprint template. If a matching is conformed, the authentication is performed and the payment will be made.

As mentioned above, the smart card system 110 may be locked once the fingerprint activation has been completed, meaning that it may be possible to disallow any further enrollment procedures to take place.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

In addition, variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method of multi-step activation of fingerprint authentication for a user of a smart card, the smart card comprising a fingerprint sensing system including a fingerprint sensor configured for capturing a fingerprint representation of a fingerprint pattern of a finger of a user, a wireless transceiver for wireless communication with an electronic transaction terminal, and processing circuitry connected to and configured to control the operation of the fingerprint sensor, the method comprising:
  acquiring, using the fingerprint sensor, a partial fingerprint representation of a portion of the user's fingerprint during a present step in the multi-step fingerprint authentication activation, wherein the present step in the multi-step fingerprint authentication activation corresponds to one transaction of a plurality of consecutive transactions;
  extracting, using the processing circuitry, fingerprint features from the partial fingerprint representation, forming a present set of fingerprint features;
  determining, using the processing circuitry, a similarity level between the present set of extracted fingerprint features and sets of previously extracted fingerprint features, wherein the sets of previously extracted fingerprint features are formed during a preceding step in the multi-step fingerprint authentication activation, wherein the preceding step in the multi-step fingerprint authentication activation corresponds to another transaction of the plurality of consecutive transactions;
  forming, using the processing circuitry, a combined set of extracted fingerprint features if the similarity level is above a first threshold;
  completing, if an enrollment criterion is met, the multi-step fingerprint authentication activation by forming a fingerprint template based on the combined set of extracted fingerprint features;
  requesting the user to input a PIN code in the electronic transaction terminal;
  authenticating the PIN code; and
  saving the fingerprint template together with an identifier for the fingerprint to thereby enroll the fingerprint of the user's finger only if the PIN code has been successfully authenticated.

2. The method according to claim 1, further comprising:
  receiving a request for user authentication of a transaction, and
  performing the user authentication based on the fingerprint template and the user's fingerprint acquired from the fingerprint sensor only if the fingerprint authentication is enabled.

3. The method according to claim 2, further comprising:
  performing, if the fingerprint authentication is not enabled, the user authentication if a transaction amount is below a threshold.

4. The method according to claim 1, wherein the enrollment criterion is based on an estimated finger coverage for the combined set of extracted fingerprint features.

5. The method according to claim 1, wherein the smart card further comprises a user interface for informing the user if the fingerprint authentication is enabled, and the method further comprises:
  activating the user interface if fingerprint authentication is activated.

6. The method according to claim 1, further comprising:
  acquiring the partial fingerprint representation of the user's fingerprint during the multi-step fingerprint authentication activation only if the PIN code is successfully authenticated.

7. The method according to claim 1, further comprising:
  initiating a transaction session between the smart card and the electronic transaction terminal; and
  performing the steps of acquiring, extracting and forming only while the transaction session is maintained.

8. The method according to claim 7, wherein the transaction session is maintained if the smart card is positioned within a predetermined distance from the electronic transaction terminal.

9. The method according to claim 8, wherein the predetermined distance is based on a wireless communication distance for near field communication (NFC).

10. The method according to claim 1, wherein the wireless communication is based on near field communication (NFC).

11. The method according to claim 1, wherein the first threshold is dynamically adjusted based on the estimated total template coverage area for the finger.

12. The method according to claim 1, wherein the first threshold is increased depending on a stage of progression of the multi-step fingerprint authentication activation.

13. A smart card comprising a fingerprint sensing system including a fingerprint sensor configured for capturing a fingerprint representation of a fingerprint pattern of a finger of a user, a wireless transceiver for wireless communication with an electronic transaction terminal, and processing circuitry connected to and configured to control the operation of the fingerprint sensor, wherein the smart card is adapted for transition between a fingerprint authentication inactive state and a fingerprint authentication active state, wherein the processing circuitry is adapted to:
  acquire, using the fingerprint sensor, a partial fingerprint representation of a portion of the user's fingerprint during a present step in the multi-step fingerprint authentication activation, wherein the present step in the multi-step fingerprint authentication activation corresponds to one transaction of a plurality of consecutive transactions;
  extract fingerprint features from the partial fingerprint representation, forming a present set of fingerprint features;
  determine a similarity level between the present set of extracted fingerprint features and sets of previously extracted fingerprint features, wherein the sets of previously extracted fingerprint features are formed during a preceding step in the multi-step fingerprint authentication activation, wherein the preceding step in the multi-step fingerprint authentication activation corresponds to another transaction of the plurality of consecutive transactions;
  form a combined set of extracted fingerprint features if the similarity level is above a first threshold;
  complete, if an enrollment criterion is met, the multi-step fingerprint authentication activation by forming a fingerprint template based on the combined set of extracted fingerprint features;
  request the user to input a PIN code in the electronic transaction terminal;
  authenticate the PIN code; and
  save the fingerprint template together with an identifier for the fingerprint to thereby enroll the fingerprint of the user's finger only if the PIN code has been successfully authenticated.

14. The smart card according to claim 13, wherein the processing circuitry is integrated with the fingerprint sensor.

15. The smart card according to claim 13, wherein the enrollment criterion is based on an estimated finger coverage for the combined set of extracted fingerprint features.

16. The smart card according to claim 13, wherein the fingerprint sensor is a capacitive fingerprint sensor.

17. A computer program product comprising a non-transitory computer readable medium having stored thereon computer program means for multi-step activation of fingerprint authentication for a user of a smart card, the smart card comprising a fingerprint sensing system including a fingerprint sensor configured for capturing a fingerprint representation of a fingerprint pattern of a finger of a user, a wireless transceiver for wireless communication with an electronic transaction terminal, and processing circuitry connected to and configured to control the operation of the fingerprint sensor, the computer program product comprising:
- code for acquiring, using the fingerprint sensor, a partial fingerprint representation of a portion of the user's fingerprint during a present step in the multi-step fingerprint authentication activation, wherein the present step in the multi-step fingerprint authentication activation corresponds to one transaction of a plurality of consecutive transactions;
- code for extracting, using the processing circuitry, fingerprint features from the partial fingerprint representation, forming a present set of fingerprint features;
- code for determining, using the processing circuitry, a similarity level between the present set of extracted fingerprint features and sets of previously extracted fingerprint features, wherein the sets of previously extracted fingerprint features are formed during a preceding step in the multi-step fingerprint authentication activation, wherein the preceding step in the multi-step fingerprint authentication activation corresponds to another transaction of the plurality of consecutive transactions;
- code for forming, using the processing circuitry, a combined set of extracted fingerprint features if the similarity level is above a first threshold;
- code for completing, if an enrollment criterion is met, the multi-step fingerprint authentication activation by forming a fingerprint template based on the combined set of extracted fingerprint features;
- code for requesting the user to input a PIN code in the electronic transaction terminal;
- code for authenticating the PIN code; and
- code for saving the fingerprint template together with an identifier for the fingerprint to thereby enroll the fingerprint of the user's finger only if the PIN code has been successfully authenticated.

18. A method of multi-step activation of fingerprint authentication for a user of a smart card, the smart card comprising a fingerprint sensing system including a fingerprint sensor configured for capturing a fingerprint representation of a fingerprint pattern of a finger of a user, a wireless transceiver for wireless communication with an electronic transaction terminal and processing circuitry connected to and configured to control the operation of the fingerprint sensor, the method comprising:
- requesting the user to input a PIN code in the electronic transaction terminal;
- authenticating the PIN code;
- acquiring, using the fingerprint sensor, only if the PIN code has been successfully authenticated, a partial fingerprint representation of a portion of the user's fingerprint during a present step in the multi-step fingerprint authentication activation, wherein the present step in the multi-step fingerprint authentication activation corresponds to one transaction of a plurality of consecutive transactions;
- extracting, using the processing circuitry, fingerprint features from the partial fingerprint representation, forming a present set of fingerprint features;
- determining, using the processing circuitry, a similarity level between the present set of extracted fingerprint features and sets of previously extracted fingerprint features, wherein the sets of previously extracted fingerprint features are formed during a preceding step in the multi-step fingerprint authentication activation, wherein the preceding step in the multi-step fingerprint authentication activation corresponds to another transaction of the plurality of consecutive transactions;
- forming, using the processing circuitry, a combined set of extracted fingerprint features if the similarity level is above a first threshold;
- completing, if an enrollment criterion is met, the multi-step fingerprint authentication activation by forming a fingerprint template based on the combined set of extracted fingerprint features;
- saving the fingerprint template together with an identifier for the fingerprint to thereby enroll the fingerprint of the user's finger, and
- enabling fingerprint authentication for the user of the smart card.

* * * * *